United States Patent [19]

Jensen

[11] Patent Number: 5,315,084
[45] Date of Patent: May 24, 1994

[54] BABY BOTTLE CATERER WITH SEPARATE REFRIGERATION AND HEATING UNITS

[76] Inventor: Martin Jensen, 21 Le Conte, Laguna Niguel, Calif. 92677

[21] Appl. No.: 16,100

[22] Filed: Feb. 10, 1993

[51] Int. Cl.⁵ .............................................. H05B 6/80
[52] U.S. Cl. .................................... 219/689; 219/710; 219/732; 165/61
[58] Field of Search .................. 219/10.55 R, 10.55 B, 219/10.55 E, 386, 428; 165/61, 65, 63

[56] References Cited

U.S. PATENT DOCUMENTS

| | | | |
|---|---|---|---|
| D. 255,329 | 6/1980 | Luck | D9/246 |
| D. 334,504 | 4/1993 | Edwards | D7/326 |
| T973,013 | 8/1978 | Ferrara et al. | 312/237 |
| 4,225,204 | 9/1980 | Bellavoine | 312/236 |
| 4,745,248 | 5/1988 | Hayes | 219/10.55 E |
| 4,791,861 | 12/1988 | Weinkle et al. | 99/357 |
| 4,796,758 | 1/1989 | Hauk | 206/545 |
| 4,847,722 | 7/1989 | Bennett | 361/31 |
| 4,866,572 | 9/1989 | Blodgett | 361/393 |
| 4,880,954 | 11/1989 | Bennett et al. | 219/10.55 |
| 4,884,626 | 12/1989 | Filipowski | 165/12 |
| 5,213,776 | 5/1993 | Maniero et al. | 219/10.55 R |

Primary Examiner—Philip H. Leung
Attorney, Agent, or Firm—Walter A. Hackler

[57] ABSTRACT

A baby bottle caterer includes a manually transportable case with a refrigeration unit disposed in said case and sized for cooling a selected number of baby bottles in an upright orientation. A heating unit is provided and disposed in said case and sized for warming at most one baby bottle in an upright orientation, with the heating unit being in a spaced apart relationship with said refrigeration unit. In addition, a control system is included for running the heating unit for a sufficient time to warm said one bottle, and formula therein, to a selected temperature.

16 Claims, 2 Drawing Sheets

BABY BOTTLE CATERER WITH SEPARATE REFRIGERATION AND HEATING UNITS

The present invention generally relates to heating and cooling devices and more particularly to a catering device having specific application for cold storage of formula-containing baby bottles in combination with heating apparatus for warming the bottles, with formula therein, prior to feeding.

A feeding schedule for a baby typically includes feeding intervals between a minimum of about three hours and a maximum of about four hours. The majority of babies generally adapt to this schedule within a few weeks.

Naturally, the schedule intervals may be shifted to those most convenient for the parents. However, no matter what the schedule, night-time feeding is mandated by the baby's needs.

Most parents find it most convenient to prepare enough formula for a full day's feeding simply because it is easier at late night or early morning hours to simply heat a prepared bottle to avoid the late night/early morning steps of boiling the bottles for sterilization and thereafter filling the bottles with formula.

However, even with a prepared formula, it can be very frustrating listening to a baby cry while waiting for the bottle to warm. Furthermore, the baby's room or crib is typically not conveniently located to the kitchen refrigerator and stove/microwave where the bottle is prepared for feeding.

In addition, while the formula may be prepared in advance, the bottle and the formula contents may assume different temperatures within the refrigerator depending upon their residence time and position within the refrigerator. Thus, because the starting bottle and contents are not of uniform temperature, preselected settings of time for a microwave or immersion in hot water do not provide for a consistently uniform temperature. It is customary to test the temperature of the formula on a person's wrist, or the like, in order to assure that overheating does not occur. However, additional heating is many times desired by the parent, thus necessitating additional microwave or hot water exposure prior to feeding. All of these steps naturally lead to additional frustration of the parent, who is more desirous of sleep than meeting the baby's nutritional requirements.

Further complicating the procedure is the fact, as hereinabove mentioned, that the baby's sleeping quarters are generally remote from the appliances necessary for storing and preparing the formula for use.

The present invention provides a convenient baby bottle caterer, which enables the storage and preparation of formula at the baby's bedside. Thus, a parent responding to the baby's crying request for food can conveniently comfort and soothe the baby while simultaneously preparing the baby formula for use.

SUMMARY OF THE INVENTION

In accordance with the present invention, a baby bottle carrier generally includes a manually transportable case and refrigeration unit disposed therein for cooling a plurality of bottles. In combination therewith, a heating unit is provided and disposed in the case, sized for warming at least one baby bottle. The heating unit is in a spaced apart relationship with the refrigeration unit, thereby allowing independent operation thereof and control means are provided for running the heating unit for a sufficient time to warm at least one baby bottle and formula therein to a selected temperature.

More particularly, in order to enhance the portability of the caterer, the refrigeration unit may be sized for cooling at most three baby bottles in an upright orientation, and the heating unit may be sized for warming at most one baby bottle in an upright orientation.

In one embodiment of the present invention, the heating unit may comprise a microwave oven and a temperature sensor disposed in the refrigeration unit to be used advantageously for enabling the control system to run the microwave oven for a sufficient time to warm the baby bottle and formula therein to the selected temperature. This feature provides an efficient system for heating formula to a preselected temperature despite the starting temperature of the baby bottle and formula. This feature will be particularly appreciated by drowsy parents by eliminating any estimation of heating time required for warming the bottle and formula to a selected temperature. Thus, this feature overcomes problems introduced by bottles of uneven temperature which may be caused by differences in residence time of the bottle in the refrigerator unit between preparation of the formula and actual use of the bottle at different times of the day.

In this regard, the temperature sensor disposed in the refrigeration unit, at a position causing contact with the bottle disposed in the refrigeration unit. Further means are provided for preventing bottle movement within the refrigeration unit during manual transport of the caterer from a kitchen area to a bedside position.

More particularly, the means for preventing bottle movement may include a spring-loaded bar disposed within the refrigerator and the temperature sensor may be incorporated in the bar.

In addition, a sensor may be provided in the microwave for weighing of the baby bottle, with formula, with a control system response thereto for controlling the warming time.

BRIEF DESCRIPTION OF THE DRAWINGS

The advantages and features of the present invention will be better understood by the following description when considered in conjunction with the accompanying drawings in which.

DETAILED DESCRIPTION

Figure 1:
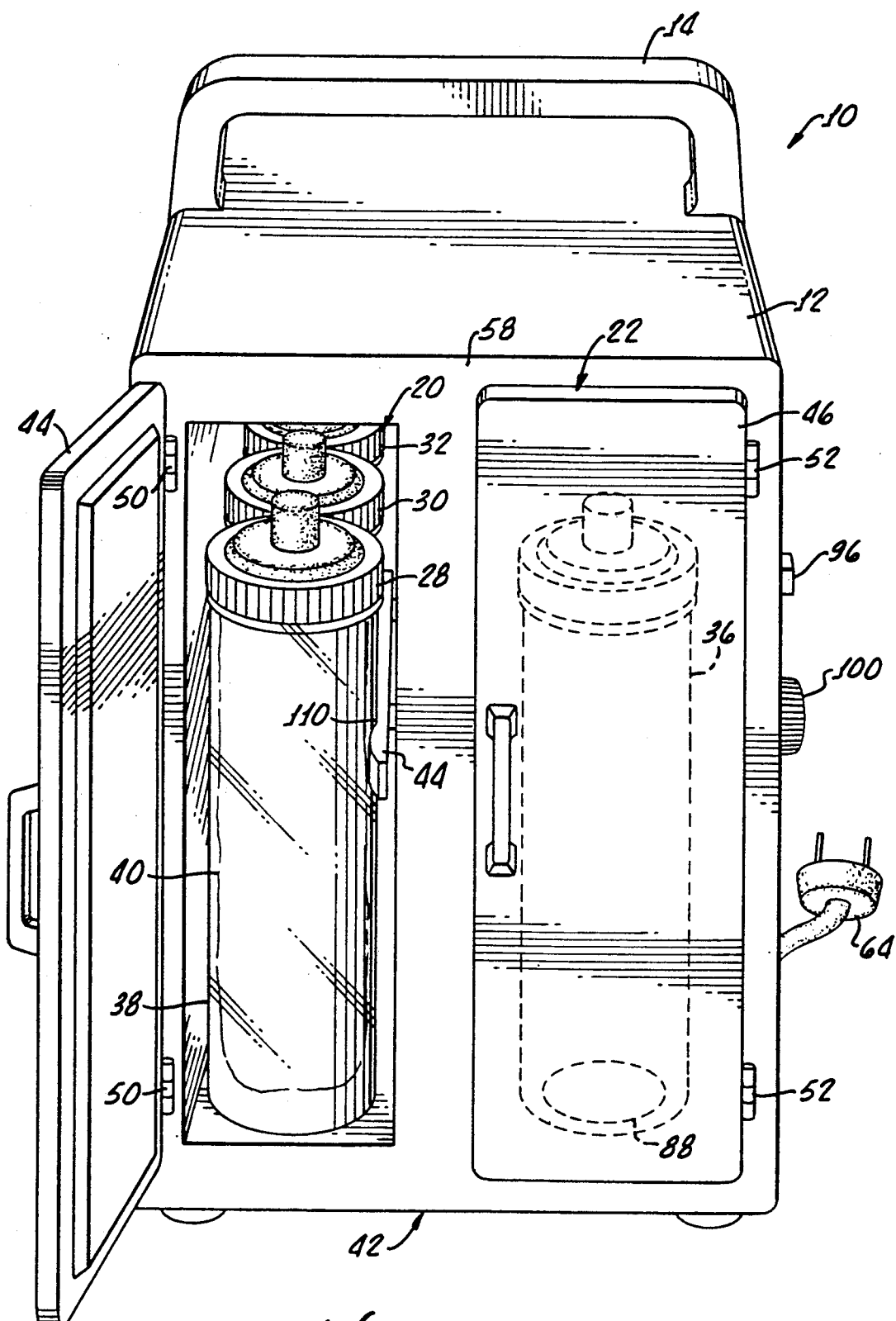
FIG. 1 is a perspective view of a baby bottle carrier in accordance with the present invention, generally showing a manually transportable case, refrigeration unit, and a heating unit.

Turning now to FIG. 1, there is shown a baby bottle caterer 10, in accordance with the present invention, which includes a case 12 having a handle 14 attached thereto for enabling convenience in manually transporting the case 12 from the baby formula preparation area, such as kitchen, to a baby's bedside location.

The case 12 may be formed from any suitable material, such as plastic, with the handle 14 preferably molded as an integral part thereof. Alternatively, the handle 14 attachment may be made by way of any conventional system such as screws (not shown) or the like.

Disposed within the case involved is a refrigeration unit 20 which may be of conventional compressor design, or preferably a thermoelectric module such as Kool Mate ® available from UDO Corporation of Salem, N.H., and a heating unit 22 which is preferably of conventional microwave construction or other electrical heating elements.

Details of the refrigeration unit 20 and heating unit 22 are not recited herein, as these units are of conventional construction, but are preferably sized so that refrigeration unit 20 is capable of cooling three baby bottles 28, 30 and 32 in an upright position, as shown, and the heating unit 22 is sized for warming at most one bottle 36 in an upright position.

The bottles 28, 30 and 32 may be of any conventional construction but are preferably constructed with a rigid outer plastic shell 38 with a collapsible plastic bag 40 therein as are available from Playtex Family Products Co.

The upright orientation of the bottles 28–36 enables a base 42 of the case 12 to be of minimum dimensions to facilitate its positioning on a bedside stand or the like. Doors 44, 46 may be hinged 50, 52 mounted to a case front 58 in a conventional manner for closing respectively the refrigeration unit 20 and heating unit 22. Conventional spring-loaded hinges 50, 52 may be utilized to maintain the doors in a closed position, and in the case of a microwave heating unit, a conventional interlock system should be provided in a conventional manner for automatically turning off the power to the heating unit 22 when the door 46 is opened. Power to the refrigeration unit and the heating unit may be provided through a conventional 110 volt outlet via a power plug 64, or, if convenient, any other source of power may be utilized. This may be of particular importance if the caterer 10 is used for travel, in which case the control system 70 (see FIG. 2) may be adapted for receiving battery power, such as from an automobile cigarette lighter or the like.

Figure 2:
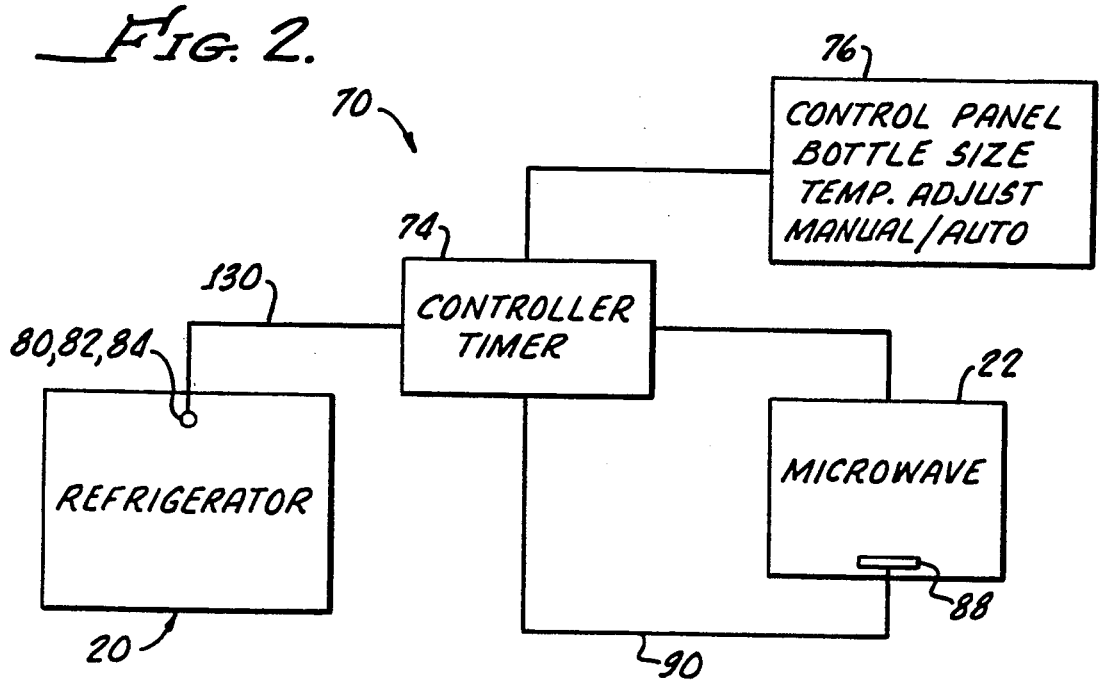
FIG. 2 is a block diagram of a control system in accordance with the present invention.

Turning now to FIG. 2, the control system 70 generally includes the controller/timer 74, a control panel 76, temperature sensors 80, 82, 84, disposed in the refrigerator unit 20, and a weight sensor 88 disposed in the heating unit 22. The weight sensor 88 may provide a signal to the controller/timer 74 as to the amount of formula in the bottle 36 for controlling the warming time thereof.

The controller/timer 74 may be of any conventional circuitry commonly used in the control of heating units, such as a microwave oven. In view of the fact that any number of electrical circuits may be utilized to provide the functions described herein, the exact description of the circuitry is not presented herein for the sake of clarity.

As also shown in FIG. 1, the weight sensor 88 provided within the microwave oven 22 and interconnected to the controller/timer 74 by means of a suitable connection 90 may also function prevent the microwave from being turned on if no bottle is present within the microwave unit 22.

The control panel 76 may be of any conventional design and include a switch 96 and a temperature selector control 100, conventionally utilized in the microwave oven industry.

Figure 3:
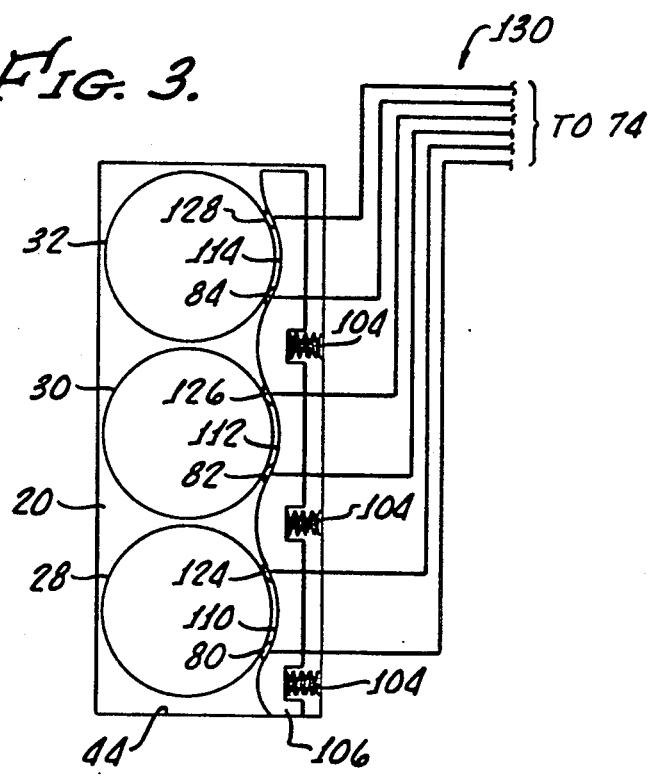

Importantly, as shown in FIG. 3, which is a cross-sectional view of the refrigeration unit 20 and bottles 28, 30, 32, a spring 104 loaded bar 106 may be provided for preventing bottle 28, 30, 32 movement within the refrigeration unit 20.

Contoured portions 110, 112, 114 respectively engage the bottles 28, 30, 32 to ensure snug fit between the bar 106 and an inside wall 120 to prevent jiggling of the bottles 28, 30, 32 during manual transport of the caterer 10.

The springs 104 sufficiently bias the bar 106 against the bottles 28, 30, 32 so that they may be moved in and out of the refrigeration unit 20, but when disposed within the refrigeration unit 20, each of the bottles 28, 30, 32 are in an indexed position. In addition, because the bottles 28, 30, 32 are in intimate contact with the refrigerator wall 22, more efficient heat transfer may be afforded.

Importantly, there may be associated with each temperature sensor 80, 82, 84 a microswitch 124, 126, 128 interconnected with the controller/timer 74 by means of a line 130.

In operation, the controller/timer 74 can sense the temperature of the bottle 80 nearest the door 44, which is next in line for heating within the microwave oven 22.

If the bottle 28 has been removed, the controller/timer 74 does not receive an indication from the microswitch 124 that the bottle 28 is no longer in position and therefore utilizes the temperature sensor 82 to determine the temperature of the bottle next to be used in the microwave.

As hereinabove noted, the controller/timer 74 may be of any conventional circuitry to perform the hereinabove-recited functions, and no claim is made to such circuitry.

Although there has been hereinabove described a baby bottle caterer in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A baby bottle caterer comprising:
   a manually transportable case;
   a refrigeration unit disposed in said case and sized for containing and cooling a selected number of baby bottles in an upright orientation;
   a heating unit disposed in said case and sized for containing and warming at most one baby bottle in an upright orientation, said heating unit being in a spaced apart relationship with said refrigeration unit; and
   control means for running the heating unit for a sufficient time to warm said one bottle, and formula therein, to a selected temperature, said control means comprising a temperature sensor disposed in said refrigerator unit and responsive to said temperature sensor for running the heating unit for sufficient time to warm said one baby bottle, and formula therein, to said selected temperature.

2. The baby bottle caterer according to claim 1, wherein the selected number of baby bottles is at most three.

3. The baby bottle caterer according to claim 1, wherein said heating unit comprises a microwave oven.

4. The baby bottle caterer according to claim 3 wherein said control means further comprises a weight sensor disposed in said microwave oven and said control means is responsive thereto for running the microwave oven for sufficient time to warm said one baby bottle, and formula therein, to said selected temperature.

5. The baby bottle caterer according to claim 4 wherein said temperature sensor is disposed in said refrigeration unit at a position causing contact with a bottle disposed in said refrigeration unit for cooling.

6. The baby bottle caterer according to claim 5 further comprising means for preventing bottle movement within the refrigeration unit during manual transport of the caterer.

7. The baby bottle caterer according to claim 6 wherein said temperature sensor is disposed in said means for preventing bottle movement.

8. A baby bottle caterer comprising:
a manually transportable case;
a refrigeration unit disposed in said case and sized for containing and cooling at most three baby bottles in an upright position;
a microwave oven disposed in said case in a spaced apart relationship with said refrigeration unit, said microwave oven being sized for containing and warming at most one baby bottle in an upright orientation; and
control means, including a temperature sensor in said refrigeration unit, and responsive to said temperature sensor, for running the microwave oven for a sufficient time to warm said one bottle, and formula therein, to a selected temperature.

9. The baby bottle caterer according to claim 8 further comprising means for preventing bottle movement within the refrigeration unit during manual transport of the caterer.

10. The baby bottle caterer according to claim 9 wherein said temperature sensor is disposed in said means for preventing bottle movement.

11. A baby bottle caterer comprising:
a manually transportable case;
a refrigeration unit disposed in said case and sized for containing and cooling a plurality of baby bottles;
a heating unit disposed in said case and sized for containing and warming at least one baby bottle, said heating unit being in a spaced apart relationship with said refrigeration unit;
control means, including a temperature sensor in said refrigeration unit, and responsive to said temperature sensor, for running the heating unit for a sufficient time to warm said at least one baby bottle, and formula therein, to a selected temperature.

12. The baby bottle caterer according to claim 11 wherein said temperature sensor is disposed in said refrigeration unit at a position causing contact with a bottle disposed in said refrigeration unit for cooling.

13. The baby bottle caterer according to claim 12 further comprising means for preventing bottle movement within the refrigeration unit during manual transport of the caterer.

14. The baby bottle caterer according to claim 13 wherein said temperature sensor is disposed in said means for preventing bottle movement.

15. The baby bottle caterer according to claim 14 wherein the refrigeration unit is sized for cooling at most three baby bottles.

16. The baby bottle caterer according to claim 15 wherein the heating unit is sized to warm one baby bottle.

* * * * *